United States Patent
Bak et al.

(10) Patent No.: US 12,103,998 B2
(45) Date of Patent: Oct. 1, 2024

(54) METHOD OF PREPARING DIENE-BASED RUBBER POLYMER AND METHOD OF PREPARING GRAFT POLYMER INCLUDING THE DIENE-BASED RUBBER POLYMER

(71) Applicant: LG CHEM, LTD., Seoul (KR)

(72) Inventors: Chang Hong Bak, Daejeon (KR); Jae Min Suk, Daejeon (KR); Jin Hyoung Lee, Daejeon (KR); Jae Won Heo, Daejeon (KR); Young Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 549 days.

(21) Appl. No.: 17/436,027

(22) PCT Filed: Aug. 24, 2020

(86) PCT No.: PCT/KR2020/011255
§ 371 (c)(1),
(2) Date: Sep. 2, 2021

(87) PCT Pub. No.: WO2021/054630
PCT Pub. Date: Mar. 25, 2021

(65) Prior Publication Data
US 2022/0169770 A1    Jun. 2, 2022

(30) Foreign Application Priority Data
Sep. 20, 2019   (KR) .................. 10-2019-0116370

(51) Int. Cl.
C08F 36/06    (2006.01)
C08F 36/00    (2006.01)
C08F 279/04   (2006.01)

(52) U.S. Cl.
CPC ............ C08F 279/04 (2013.01); C08F 36/00 (2013.01); C08F 36/06 (2013.01)

(58) Field of Classification Search
CPC .......... C08F 36/00; C08F 36/06; C08F 2/001; C08F 2/24; C08F 2/38
See application file for complete search history.

(56) References Cited

U.S. PATENT DOCUMENTS

| | | | |
|---|---|---|---|
| 4,246,156 A * | 1/1981 | Heins | C08F 212/02 |
| | | | 524/460 |
| 5,599,854 A * | 2/1997 | Troy | C08F 279/06 |
| | | | 526/86 |
| 2003/0018125 A1 | 1/2003 | Yoo et al. | |
| 2003/0032741 A1 | 2/2003 | Guentherberg et al. | |
| 2006/0211817 A1 | 9/2006 | Cha et al. | |
| 2009/0118393 A1 | 5/2009 | Yoo et al. | |
| 2017/0226236 A1 * | 8/2017 | Lee | C08F 36/06 |
| 2017/0260303 A1 | 9/2017 | Chung et al. | |
| 2017/0327618 A1 | 11/2017 | Chai et al. | |
| 2017/0327619 A1 * | 11/2017 | Suk | C08K 5/053 |
| 2018/0201715 A1 | 7/2018 | Chai et al. | |
| 2018/0340035 A1 * | 11/2018 | Lee | C08F 236/10 |
| 2018/0362750 A1 | 12/2018 | Lee et al. | |
| 2019/0016841 A1 | 1/2019 | Han et al. | |
| 2019/0023894 A1 * | 1/2019 | Han | C08F 279/04 |
| 2021/0163736 A1 | 6/2021 | Chai et al. | |

FOREIGN PATENT DOCUMENTS

| | | |
|---|---|---|
| CN | 101429266 A | 5/2009 |
| CN | 107001544 A | 8/2017 |
| CN | 108368189 A | 8/2018 |
| CN | 110204656 A | 9/2019 |
| EP | 1265961 A1 | 12/2002 |
| EP | 2404941 A1 | 1/2012 |
| EP | 3231821 A1 | 10/2017 |
| EP | 3239198 A1 | 11/2017 |
| EP | 3363833 A1 | 8/2018 |
| EP | 3381957 A1 | 10/2018 |
| EP | 3385292 A1 | 10/2018 |
| KR | 10-1995-011450 B | 10/1995 |
| KR | 10-2008-0043926 A | 5/2008 |
| KR | 10-2009-0047063 A | 5/2009 |
| KR | 10-2012-0004261 A | 1/2012 |
| KR | 10-2015-0037518 A | 4/2015 |
| KR | 10-2016-0077627 A | 7/2016 |
| KR | 10-1690381 B | 12/2016 |
| KR | 10-2017-0098001 A1 | 8/2017 |
| KR | 10-2013184 B | 8/2019 |

OTHER PUBLICATIONS

Extended European Search Report for related Application No. 20864632.3, Mailed Feb. 22, 2022.

* cited by examiner

Primary Examiner — Robert C Boyle

(57) ABSTRACT

Provided is a method of preparing a diene-based rubber polymer, which includes: adding each of a diene-based monomer, a molecular-weight regulator, an initiator, and an emulsifier to a reactor a first time and carrying out polymerization; adding a molecular-weight regulator to the reactor a second time when a polymerization conversion rate of 48 to 72% is reached and carrying out polymerization; adding a diene-based monomer to the reactor a second time when a polymerization conversion rate of 63 to 77% is reached and carrying out polymerization; adding each of an initiator and an emulsifier to the reactor a second time when a polymerization conversion rate of 68 to 81% is reached and carrying out polymerization; and adding each of an initiator and an emulsifier to the reactor a third time when a polymerization conversion rate of 85 to 91% is reached and carrying out polymerization.

10 Claims, No Drawings

METHOD OF PREPARING DIENE-BASED RUBBER POLYMER AND METHOD OF PREPARING GRAFT POLYMER INCLUDING THE DIENE-BASED RUBBER POLYMER

CROSS-REFERENCE TO RELATED APPLICATION

This application is a National Phase of International Application No. PCT/KR2020/011255, which claims priority to and the benefit of Korean Patent Application No. 10-2019-0116370, filed on Sep. 20, 2019, the disclosures of which are incorporated herein by reference in its their entirety.

TECHNICAL FIELD

The present invention relates to a method of preparing a diene-based rubber polymer and a method of preparing a graft polymer including the diene-based rubber polymer, and more particularly, to a method of preparing a diene-based rubber polymer in which the time points at which a molecular-weight regulator, a diene-based monomer, an initiator, and an emulsifier are additionally added are controlled and a method of preparing a graft polymer including the diene-based rubber polymer.

BACKGROUND ART

Diene-based graft polymers are copolymers prepared by graft-polymerizing an aromatic vinyl-based monomer and a vinyl cyanide-based monomer to a diene-based rubber polymer. The diene-based graft polymers are widely used as impact modifiers in thermoplastic resin compositions due to the excellent rubber properties of diene-based rubber polymers. In addition, the diene-based graft polymers are widely used as materials for electrical products, electronic products, automobile parts, general office supplies, and the like.

Meanwhile, for the diene-based graft polymers, in addition to physical properties such as impact strength, appearance characteristics such as color and surface gloss are emerging as important quality issues. In order to prepare diene-based graft polymers having excellent impact strength and excellent appearance characteristics, a diene-based graft polymer containing both a diene-based rubber polymer having a small particle diameter and a rubber polymer having a large particle diameter was developed, but there were limitations to improving both the impact strength and the appearance characteristics. In addition, there were problems that physical properties varied depending on the injection-molding conditions of a thermoplastic resin composition including the diene-based graft polymer, and since the diene-based rubber polymer having a small particle diameter and the rubber polymer having a large particle diameter should be prepared separately, preparing efficiency was lowered.

DISCLOSURE

Technical Problem

The present invention is directed to providing a method of preparing a diene-based rubber polymer capable of improving both the impact strength and surface gloss of a graft polymer and a method of preparing a graft polymer including the diene-based rubber polymer.

In addition, the present invention is directed to providing a method of preparing a diene-based rubber polymer which has minimized polymerization loss due to having improved latex stability and polymerization stability and thus has improved preparing efficiency and a method of preparing a graft polymer including the diene-based rubber polymer.

Technical Solution

One aspect of the present invention provides a method of preparing a diene-based rubber polymer, which includes: adding each of a diene-based monomer, a molecular-weight regulator, an initiator, and an emulsifier to a reactor a first time and carrying out polymerization; adding a molecular-weight regulator to the reactor a second time when a polymerization conversion rate of 48 to 72% is reached and carrying out polymerization; adding a diene-based monomer to the reactor a second time when a polymerization conversion rate of 63 to 77% is reached and carrying out polymerization; adding each of an initiator and an emulsifier to the reactor a second time when a polymerization conversion rate of 68 to 81% is reached and carrying out polymerization; and adding each of an initiator and an emulsifier to the reactor a third time when a polymerization conversion rate of 85 to 91% is reached and carrying out polymerization.

Another aspect of the present invention provides a method of preparing a graft polymer, which includes: preparing a diene-based rubber polymer by the above-described preparing method; and graft-polymerizing an aromatic vinyl-based monomer and a vinyl cyanide-based monomer to the diene-based rubber polymer and thus preparing a graft polymer.

Advantageous Effects

According to a method of preparing a diene-based rubber polymer of the present invention, since a diene-based rubber polymer having a small particle diameter, a diene-based rubber polymer having a medium particle diameter, and a diene-based rubber polymer having a large particle diameter can be simultaneously produced and a diene-based rubber polymer having an appropriate gel content can be produced, a graft polymer having excellent impact strength and excellent surface gloss can be produced. In addition, according to the method of preparing a diene-based rubber polymer of the present invention, since latex stability and polymerization stability are improved, polymerization loss can be minimized, and thus preparing efficiency can be improved.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present invention, a polymerization conversion rate refers to a degree to which monomers are polymerized to form a polymer, and may be calculated by the following equation.

Polymerization conversion rate (%) =

[(Total weight of monomers participating in reaction at the time of measuring polymerization conversion rate)/

(Weight of monomers added until end of polymerization)] × 100

In the present invention, a gel content may be calculated by the method described below.

First, a precipitate is obtained while adding a diene-based rubber polymer latex to ethanol. The precipitate is passed through a wire mesh and then dried a first time. The obtained first dried product is added to toluene and stored in a dark room. The precipitate, which is swollen, is passed through a wire mesh and then dried a second time to obtain a second dried product. Subsequently, the weights of the first dried product and the second dried product are separately measured, and the results are substituted into the following equation to calculate a gel content.

Gel content(%) = [Weight of second dried product (g)/

Weight of first dried product added to toluene (g)] × 100

In the present invention, an average particle diameter of a diene-based rubber polymer can be measured by diluting a diene-based rubber polymer latex with distilled water and generating a Gaussian distribution using a Particle Sizing Systems Nicomp 380HPL instrument.

In the present invention, the particle size distribution of a diene-based rubber polymer can be obtained by diluting a diene-based rubber polymer latex with distilled water and using capillary hydrodynamic fractionation (CHDF) equipment (Model 4000 manufactured by Matec Applied Science).

In the present invention, a diene-based rubber polymer having a small particle diameter may refer to a diene-based rubber polymer having a particle diameter of 30 nm or more and less than 100 nm, a diene-based rubber polymer having a medium particle diameter may refer to a diene-based rubber polymer having a particle diameter of 100 nm or more and less than 350 nm, and a diene-based rubber polymer having a large particle diameter may refer to a diene-based rubber polymer having a particle diameter of 350 nm to 550 nm.

In the present invention, a diene-based monomer may be one or more selected from the group consisting of 1,3-butadiene, isoprene, chloroprene, and piperylene and is preferably 1,3-butadiene.

In the present invention, an aromatic vinyl-based monomer may be one or more selected from the group consisting of styrene, α-methylstyrene, α-ethylstyrene, and p-methylstyrene and is preferably styrene.

In the present invention, a vinyl cyanide-based monomer may be one or more selected from the group consisting of acrylonitrile, methacrylonitrile, phenyl acrylonitrile, and α-chloroacrylonitrile and is preferably acrylonitrile.

In the present invention, a molecular-weight regulator may be one or more selected from the group consisting of an α-methylstyrene dimer, t-dodecyl mercaptan, n-dodecyl mercaptan, t-octyl mercaptan, n-octyl mercaptan, carbon tetrachloride, methylene chloride, methylene bromide, tetraethylthiuram disulfide, dipentamethylene thiuram disulfide, and diisopropyl xanthogen disulfide and is preferably t-dodecyl mercaptan.

In the present invention, an initiator may be one or more selected from the group consisting of potassium persulfate, sodium persulfate, ammonium persulfate, cumene hydroperoxide, diisopropyl benzene hydroperoxide, azobis(isobutyronitrile), t-butyl hydroperoxide, p-menthane hydroperoxide, and benzoyl peroxide and is preferably one or more selected from the group consisting of potassium persulfate and t-butyl hydroperoxide.

In the present invention, an emulsifier may be one or more selected from the group consisting of potassium oleate, sodium dicyclohexyl sulfosuccinate, sodium dihexyl sulfosuccinate, sodium di-2-ethylhexyl sulfosuccinate, potassium di-2-ethylhexyl sulfosuccinate, sodium dioctyl sulfosuccinate, sodium dodecyl sulfate, sodium dodecylbenzene sulfate, sodium octadecyl sulfate, sodium oleic sulfate, potassium dodecyl sulfate, potassium octadecyl sulfate, potassium rosinate, and sodium rosinate and is preferably one or more selected from the group consisting of potassium oleate, potassium rosinate, and sodium rosinate.

1. Method of Preparing Diene-Based Rubber Polymer

A method of preparing a diene-based rubber polymer according to one embodiment of the present invention includes: adding each of a diene-based monomer, a molecular-weight regulator, an initiator, and an emulsifier to a reactor a first time and carrying out polymerization; adding a molecular-weight regulator to the reactor a second time when a polymerization conversion rate of 48 to 72% is reached and carrying out polymerization; adding a diene-based monomer to the reactor a second time when a polymerization conversion rate of 63 to 77% is reached and carrying out polymerization; adding each of an initiator and an emulsifier to the reactor a second time when a polymerization conversion rate of 68 to 81% is reached and carrying out polymerization; and adding each of an initiator and an emulsifier to the reactor a third time when a polymerization conversion rate of 85 to 91% is reached and carrying out polymerization.

The inventors of the present invention have found that by controlling the time point at which a molecular-weight regulator is added a second time, it is possible to control a gel content of a diene-based rubber polymer, and by controlling the time points at which an initiator and an emulsifier is added a second time and a third time, it is possible to prepare a trimodal-type diene-based rubber polymer while securing latex stability. In addition, the inventors have found that by using such a diene-based rubber polymer, it is possible to prepare a graft polymer having excellent impact strength and excellent surface gloss, and thus completed the present invention.

Hereinafter, a method of preparing a diene-based rubber polymer according to one embodiment of the present invention will be described in detail.

First, each of a diene-based monomer, a molecular-weight regulator, an initiator, and an emulsifier is added to a reactor and polymerized.

The diene-based monomer, the molecular-weight regulator, the initiator, and the emulsifier may be added a first time before polymerization is initiated.

Meanwhile, when a polymerization conversion rate of 48 to 72% and preferably 50 to 70% is reached, a molecular-weight regulator is added to the reactor a second time and polymerized. When a molecular-weight regulator is added a second time at this time point, since the gel content of a diene-based rubber polymer can be appropriately adjusted, a graft polymer having improved impact strength can be produced. However, when a molecular-weight regulator is not added a second time, since a diene-based rubber polymer having a high gel content is produced, the impact strength of a graft polymer may be significantly lowered. In addition, when a molecular-weight regulator is added a second time at a time point earlier than the above-described time point, since a diene-based rubber polymer having a low gel content is produced, the impact strength of a graft polymer may be significantly lowered. In addition, when a molecular-weight regulator is added a second time at a time point later than the above-described time point, since a diene-based rubber polymer having a high gel content is produced, the impact strength of a graft polymer may be significantly lowered.

The total weight of molecular-weight regulator added in the method of preparing a diene-based rubber polymer may be in the range of 0.1 to 0.8 parts by weight, preferably 0.3 to 0.6 parts by weight, and more preferably 0.4 to 0.5 parts by weight relative to 100 parts by weight of the total weight of diene-based monomer added in the method of preparing a diene-based rubber polymer. When this range is satisfied, an excessive increase in the weight-average molecular weight of a diene-based rubber polymer can be prevented.

The weight ratio of the molecular-weight regulator added the first time and the molecular-weight regulator added the second time may be in the range of 60:40 to 75:25 and preferably 65:35 to 70:30. When this condition is satisfied, there is an advantage that the rate of emulsion polymerization can be easily controlled, and excessive exothermic reactions can be suppressed.

Meanwhile, when a polymerization conversion rate of 63 to 77% and preferably 65 to 75% is reached, a diene-based monomer is added to the reactor a second time and polymerized. When a diene-based monomer is added a second time at this time point, since the gel content of a diene-based rubber polymer can be appropriately adjusted, a graft polymer having improved impact strength can be produced. In addition, since an appropriate amount of diene-based rubber polymer having a small particle diameter can be simultaneously produced, a graft polymer having improved surface gloss can be produced. However, when a diene-based monomer is not added a second time or is added a second time at a time point earlier than the above-described time point, since a small amount of diene-based rubber polymer having a small particle diameter is produced or the diene-based rubber polymer is not produced at all, the surface gloss of a graft polymer may be significantly lowered. In addition, when a diene-based monomer is added a second time at a time point later than the above-described time point, since small amounts of diene-based rubber polymer having a medium particle diameter and diene-based rubber polymer having a large particle diameter are produced, the impact strength of a graft polymer may be lowered.

The weight ratio of the diene-based monomer added the first time and the diene-based monomer added the second time may be in the range of 70:30 to 90:10 and preferably 75:25 to 85:15. When this condition is satisfied, a polymerization conversion rate can be effectively controlled, and a diene-based rubber polymer having an appropriate gel content can be obtained.

Meanwhile, when a polymerization conversion rate of 68 to 81% and preferably 70 to 80% is reached, each of an initiator and an emulsifier is added to the reactor a second time and polymerized. When this time point is satisfied, the gel content of a diene-based rubber polymer can be appropriately adjusted, and since an appropriate amount of diene-based rubber polymer having a small particle diameter is produced, a graft polymer having excellent surface gloss and excellent impact strength can be produced. When an initiator is not added a second time, since small amounts of diene-based rubber polymer having a medium particle diameter and diene-based rubber polymer having a large particle diameter may be produced, the impact strength of a graft polymer may be lowered. When each of an initiator and an emulsifier is added a second time at a time point earlier than the above-described time point, since a small amount of diene-based rubber polymer having a small particle diameter may be produced, the surface gloss of a graft polymer may be lowered. When each of an initiator and an emulsifier is added a second time at a time point later than the above-described time point, since small amounts of diene-based rubber polymer having a small particle diameter and diene-based rubber polymer having a large particle diameter are produced, the impact strength of a graft polymer may be lowered.

Meanwhile, when a polymerization conversion rate of 85 to 91% and preferably 85 to 90% is reached, each of an initiator and an emulsifier is added to the reactor a third time and polymerized. When this time point is satisfied, the gel content of a diene-based rubber polymer can be appropriately adjusted, and since an appropriate amount of diene-based rubber polymer having a small particle diameter can be produced, a graft polymer having excellent surface gloss and excellent impact strength can be produced. When an initiator is not added a third time, since a small amount of diene-based rubber polymer having a small particle diameter is produced or the diene-based rubber polymer is not produced at all, the surface gloss of a graft polymer may be lowered. When each of an initiator and an emulsifier is added a third time at a time point earlier than the above-described time point, since small amounts of diene-based rubber polymer having a medium particle diameter and diene-based rubber polymer having a large particle diameter are produced, the impact strength of a graft polymer may be lowered. When each of an initiator and an emulsifier is added a third time at a time point later than the above-described time point, a small amount of diene-based rubber polymer having a small particle diameter may be produced or the diene-based rubber polymer may not be produced at all, and the surface gloss of a graft polymer may be lowered.

The total weight of initiator added in the method of preparing a diene-based rubber polymer may be in the range of 0.1 to 0.8 parts by weight, preferably 0.3 to 0.6 parts by weight, and more preferably 0.35 to 0.5 parts by weight relative to 100 parts by weight of the total weight of diene-based monomer added in the method of preparing a diene-based rubber polymer. When this range is satisfied, an excessive increase in the weight-average molecular weight of a diene-based rubber polymer can be prevented, and a polymerization conversion rate can be easily controlled.

Meanwhile, based on the total weight of initiator added the first time, second time, and third time, the weight of initiator added the first time may be in the range of 60 to 80%, the weight of initiator added the second time may be in the range of 7 to 25%, and the weight of initiator added the third time may be in the range of 5 to 20%, and preferably, the weight of initiator added the first time is in the range of 65 to 75%; the weight of initiator added the second time is in the range of 10 to 20%, and the weight of initiator added the third time is in the range of 7 to 15%. When these conditions are satisfied, emulsion polymerization can be stably performed, and at the same time, the possibility that an initiator remains in a polymer can be minimized.

The total weight of emulsifier added in the method of preparing a diene-based rubber polymer may be in the range of 0.5 to 3.5 parts by weight, preferably 1 to 3 parts by weight, and more preferably 1.5 to 2.5 parts by weight relative to 100 parts by weight of the total weight of diene-based monomer added in the method of preparing a diene-based rubber polymer. When this range is satisfied, emulsion polymerization can be stably performed, and the possibility that an emulsifier remains in a polymer can be minimized.

In addition, based on the total weight of emulsifier added the first time, second time, and third time, the weight of emulsifier added the first time may be in the range of 65 to 85%, the weight of emulsifier added the second time may be in the range of 10 to 30%, and the weight of emulsifier added the third time may be in the range of 3 to 15%, and preferably, the weight of emulsifier added the first time is in the range of 70 to 80%, the weight of emulsifier added the second time is in the range of 12 to 25%, and the weight of emulsifier added the third time is in the range of 5 to 10%. When these conditions are satisfied, a diene-based rubber polymer having excellent stability and less polymerization coagulum can be produced.

Here, the time point at which the initiator and the emulsifier are added the second time and the time point at which the initiator and the emulsifier are added the third time may be the same or different.

A diene-based rubber polymer prepared by a method of preparing a diene-based rubber polymer according to one embodiment of the present invention may have a gel content of 70 to 85% and preferably 70 to 80%. When this condition is satisfied, a graft polymer having excellent impact strength can be produced.

A diene-based rubber polymer prepared by a method of preparing a diene-based rubber polymer according to one embodiment of the present invention may include a diene-based rubber polymer having a small particle diameter at 2 to 6 wt %, a diene-based rubber polymer having a medium particle diameter at 70 to 85 wt %, and a diene-based rubber polymer having a large particle diameter at 10 to 25 wt %, and preferably includes a diene-based rubber polymer having a small particle diameter at 3 to 5 wt %, a diene-based rubber polymer having a medium particle diameter at 76 to 83 wt %, and a diene-based rubber polymer having a large particle diameter at 13 to 21 wt %. When these conditions are satisfied, a graft polymer having excellent surface gloss and excellent impact strength can be produced.

A diene-based rubber polymer prepared by a method of preparing a diene-based rubber polymer according to one embodiment of the present invention may have an average particle diameter of 280 to 330 nm and preferably 290 to 320 nm. When this condition is satisfied, a graft polymer having excellent impact strength can be produced.

2. Method of Preparing Graft Polymer

A method of preparing a graft polymer according to another embodiment of the present invention may include: preparing a diene-based rubber polymer by the preparing method according to one embodiment of the present invention; and graft-polymerizing an aromatic vinyl-based monomer and a vinyl cyanide-based monomer to the diene-based rubber polymer and thus preparing a graft polymer.

The weight of diene-based rubber polymer used in the graft-polymerization may be 50 to 70 parts by weight and preferably 55 to 65 parts by weight relative to 100 parts by weight of the sum of weights of the diene-based rubber polymer, the aromatic vinyl-based monomer, and the vinyl cyanide-based monomer. When this condition is satisfied, a graft polymer having excellent impact resistance and excellent surface gloss can be produced.

The weight of aromatic vinyl-based monomer used in the graft-polymerization may be 20 to 40 parts by weight and preferably 25 to 35 parts by weight relative to 100 parts by weight of the sum of weights of the diene-based rubber polymer, the aromatic vinyl-based monomer, and the vinyl cyanide-based monomer. When this condition is satisfied, a graft polymer having excellent processability can be produced.

The weight of vinyl cyanide-based monomer used in the graft-polymerization may be 5 to 20 parts by weight and preferably 7 to 15 parts by weight relative to 100 parts by weight of the sum of weights the diene-based rubber polymer, the aromatic vinyl-based monomer, and the vinyl cyanide-based monomer. When this condition is satisfied, a graft polymer having excellent chemical resistance can be produced.

Hereinafter, exemplary embodiments of the present invention will be described in detail so that those of ordinary skill in the art can easily carry out the present invention. However, the present invention can be implemented in various forms and are not limited by the exemplary embodiments described herein.

Example 1

<Preparation of Diene-Based Rubber Polymer>

To a nitrogen-substituted reactor, 55 parts by weight of ion exchanged water, 0.15 parts by weight of $K_2CO_3$ used as an electrolyte, 0.3 parts by weight of t-dodecyl mercaptan used as a molecular-weight regulator, 85 parts by weight of 1,3-butadiene used as a diene-based monomer, 0.3 parts by weight of potassium persulfate used as an initiator, and 1.5 parts by weight of a fatty acid potassium salt (potassium oleate manufactured by Laton Korea Co., Ltd.) used as an emulsifier were added a first time, and after raising the temperature of the reactor to 70° C., polymerization was initiated. When a polymerization conversion rate of 55% was reached, 0.15 parts by weight of t-dodecyl mercaptan used as a molecular-weight regulator was added to the reactor a second time and polymerized. When a polymerization conversion rate of 70% was reached, 15 parts by weight of 1,3-butadiene used as a diene-based monomer was added to the reactor a second time and polymerized. When a polymerization conversion rate of 75% was reached, 0.07 parts by weight of potassium persulfate used as an initiator and 0.37 parts by weight of potassium rosinate used as an emulsifier were added to the reactor a second time and polymerized. When a polymerization conversion rate of 85% was reached, 0.05 parts by weight of potassium persulfate used as an initiator and 0.15 parts by weight of potassium rosinate used as an emulsifier were added to the reactor a third time and polymerized. Subsequently, when a polymerization conversion rate of 93% was reached, polymerization was terminated and a diene-based rubber polymer latex was obtained.

<Preparation of Graft Polymer Powder>

A first mixture in which 10 parts by weight of acrylonitrile, 30 parts by weight of styrene, 25 parts by weight of ion-exchanged water, 0.12 parts by weight of t-butyl hydroperoxide, 0.9 parts by weight of potassium rosinate, and 0.35 parts by weight of t-dodecyl mercaptan were uniformly mixed and a second mixture in which 0.054 parts by weight of dextrose, 0.004 parts by weight of sodium pyrophosphate, and 0.002 parts by weight of ferrous sulfate were uniformly mixed were prepared.

To a nitrogen-substituted reactor, 60 parts by weight of the above-described diene-based rubber latex and 100 parts by weight of ion-exchanged water were added, and the first mixture and the second mixture were continuously added at a constant rate for three hours at a temperature of 70° C. After the continuous addition was completed, 0.05 parts by weight of dextrose, 0.03 parts by weight of sodium pyrophosphate, 0.001 parts by weight of ferrous sulfate, and 0.05 parts by weight of t-butyl hydroperoxide were batch-added to the reactor. After raising the temperature of the reactor to 80° C. over one hour, polymerization was terminated, and a graft polymer latex was obtained. The polymerization conversion rate at this time was 97%.

Subsequently, 45 parts by weight of the graft polymer latex was coagulated by adding 2 parts by weight of magnesium sulfate, and the resultant was aged, washed, dehydrated, and dried to prepare a graft polymer powder.

<Preparation of Thermoplastic Resin Composition>

A thermoplastic resin composition was prepared by uniformly mixing 23 parts by weight of the graft polymer powder and 77 parts by weight of 92HR (styrene/acrylonitrile copolymer) prepared by LG Chem.

Examples 2 to 11 and Comparative Examples 1 to 14

<Preparation of Diene-Based Rubber Polymer>

A diene-based rubber polymer was prepared in the same manner as in Example 1 except that when a time point as shown below in Tables was reached, t-dodecyl mercaptan used as a molecular-weight regulator, 1,3-butadiene used as a diene-based monomer, potassium persulfate used as an initiator, and potassium rosinate used as an emulsifier were added to the reactor a first, second, or third time as shown below in Tables and polymerized.

<Preparation of Graft Polymer>

A graft polymer powder was prepared in the same manner as in Example 1 except that coagulation was induced by adding magnesium sulfate or sulfuric acid as shown below in Tables and then the resultant was aged, washed, dehydrate, and dried to prepare the graft polymer powder.

<Preparation of Thermoplastic Resin Composition>

A thermoplastic resin composition was prepared by uniformly mixing 23 parts by weight of the graft polymer powder and 77 parts by weight of 92HR (styrene/acrylonitrile copolymer) prepared by LG Chem.

Experimental Example 1

Physical properties of the diene-based rubber polymer latexes of Examples and Comparative Examples were measured by the methods described below, and the results are shown below in Tables.

① Average particle diameter (nm): The average particle diameter was measured by diluting 1 g of a diene-based rubber polymer latex with 100 g of distilled water and then generating a Gaussian distribution using a Particle Sizing Systems Nicomp 380HPL instrument.

② Particle size distribution (%): The particle size distribution was obtained by diluting 1 g of a diene-based rubber polymer latex with 100 g of distilled water and using CHDF equipment (Model 4000 manufactured by Matec Applied Science).

③ Coagulum content (wt %): After passing a diene-based rubber polymer latex through a 100-mesh wire mesh, a reaction product that did not pass through the wire mesh and remained on the wire mesh was dried for one hour in a hot-air dryer set at 100° C., and the weight of coagulum was measured and the result was substituted into the following equation to calculate the coagulum content.

Coagulum content (wt %)={Weight of coagulum (g)/Total weight of reaction products (g)}×100

④ Gel content (%): A precipitate was obtained while slowly adding 10 g of a diene-based rubber polymer latex to 100 g of ethanol. The precipitate was passed through a 80-mesh wire mesh and then dried a first time at 55° C. for four hours. 1 g of a first dried product was added to 100 g of toluene and then stored in a dark room for 12 hours. Subsequently, the precipitate, which was swollen, was passed through a 80-mesh wire mesh and then dried a second time at 85° C. for four hours, and thereby a second dried product was obtained. The weights of the first dried product and the second dried product were substituted into the following equation to calculate the gel content.

Gel content(%) = [Weight of second dried product (g)/ Weight of first dried product added to toluene (g)] × 100

Experimental Example 2

The thermoplastic resin compositions of Examples and Comparative Examples were extruded to form pellets, and a physical property of the pellets was measured by the method described below, and the results are shown below in Tables.

⑤ Melt flow index (g/10 min): The melt flow index was measured under the conditions of 220° C. and 10 kg in accordance with ASTM D1238.

Experimental Example 3

The thermoplastic resin compositions of Examples and Comparative Examples were extruded to form pellets, and the pellets were injection-molded to prepare specimens. Physical properties of the specimens were measured by the methods described below, and the results are shown below in Tables.

⑥ Impact strength (kgf·cm/cm): The impact strength was measure using an impact strength tester (manufactured by Tinius Olsen) in accordance with ASTM D256.

⑦ Tensile strength: The tensile strength was measured in accordance with ASTM D638.

⑧ Surface gloss: The surface gloss was measured at 20° and 45° using a gloss meter in accordance with ASTM D528. Larger values mean better surface gloss.

TABLE 1

| Classification | | | | Comparative Example | | | |
|---|---|---|---|---|---|---|---|
| | | | | 1 | 2 | 3 | 4 |
| Preparation of diene-based rubber polymer [Polymerization conversion rate (%)] | First addition | Molecular-weight regulator | Time point | 0 | 0 | 0 | 0 |
| | | | Parts by weight | 0.3 | 0.3 | 0.3 | 0.3 |
| | | Diene-based monomer | Time point | 0 | 0 | 0 | 0 |
| | | | Parts by weight | 85 | 85 | 85 | 85 |
| | | Initiator | Time point | 0 | 0 | 0 | 0 |
| | | | Parts by weight | 0.3 | 0.3 | 0.3 | 0.3 |
| | | Emulsifier | Time point | 0 | 0 | 0 | 0 |
| | | | Parts by weight | 1.5 | 1.5 | 1.5 | 1.5 |
| | Second addition | Molecular-weight regulator | Time point | — | — | — | 45 |
| | | | Parts by weight | — | — | — | 0.15 |
| | | Diene-based monomer | Time point | 70 | 70 | 70 | 70 |
| | | | Parts by weight | 15 | 15 | 15 | 15 |
| | | Initiator | Time point | 65 | 65 | 75 | 75 |
| | | | Parts by weight | 0.07 | 0.07 | 0.07 | 0.07 |
| | | Emulsifier | Time point | 65 | 65 | 75 | 75 |
| | | | Parts by weight | 0.37 | 0.37 | 0.37 | 0.37 |
| | Third addition | Initiator | Time point | — | — | 85 | 85 |
| | | | Parts by weight | — | — | 0.05 | 0.05 |
| | | Emulsifier | Time point | — | — | 85 | 85 |
| | | | Parts by weight | — | — | 0.15 | 0.15 |
| Diene-based rubber polymer | Average particle diameter (nm) | | | 301.1 | 301.1 | 305.8 | 305.5 |
| | Particle diameter distribution (%) | 30 ≤ Particle diameter (nm) < 100 | | 0 | 0 | 3 | 3 |
| | | 100 ≤ Particle diameter (nm) < 350 | | 85 | 85 | 83 | 82 |
| | | 350 ≤ Particle diameter (nm) ≤ 550 | | 15 | 15 | 14 | 15 |
| | Coagulum content (wt %) | | | 0.4 | 0.4 | 0.32 | 0.12 |
| | Gel content (%) | | | 89.5 | 89.5 | 90.3 | 65.5 |
| Graft polymer | Graft polymer latex (parts by weight) | | | 45 | 45 | 45 | 45 |
| | Coagulant (parts by weight) | Magnesium sulfate | | 2 | — | 2 | 2 |
| | | Sulfuric acid | | — | 2 | — | — |
| Thermoplastic resin composition | Flow index (10 g/min) | | | 27.3 | 29.6 | 26.3 | 26.9 |
| | Impact strength (kgf · cm/cm) | | | 21 | 19.6 | 19.2 | 20.5 |
| | Tensile strength (kgf/cm$^2$) | | | 480 | 499 | 508 | 503 |
| | Surface gloss | 20° | | 74.5 | 64.2 | 78.9 | 82.7 |
| | | 45° | | 90.2 | 88.1 | 93.5 | 95.5 |

TABLE 2

| Classification | | | | Example | | | | | |
|---|---|---|---|---|---|---|---|---|---|
| | | | | 1 | 2 | 3 | 4 | 5 | 6 |
| Preparation of diene-based rubber polymer [Polymerization conversion rate (%)] | First addition | Molecular-weight regulator | Time point | 0 | 0 | 0 | 0 | 0 | 0 |
| | | | Parts by weight | 0.3 | 0.3 | 0.3 | 0.3 | 0.3 | 0.3 |
| | | Diene-based monomer | Time point | 0 | 0 | 0 | 0 | 0 | 0 |
| | | | Parts by weight | 85 | 85 | 85 | 85 | 85 | 85 |
| | | Initiator | Time point | 0 | 0 | 0 | 0 | 0 | 0 |
| | | | Parts by weight | 0.3 | 0.3 | 0.3 | 0.3 | 0.3 | 0.3 |
| | | Emulsifier | Time point | 0 | 0 | 0 | 0 | 0 | 0 |
| | | | Parts by weight | 1.5 | 1.5 | 1.5 | 1.5 | 1.5 | 1.5 |
| | Second addition | Molecular-weight regulator | Time point | 50 | 55 | 55 | 65 | 65 | 70 |
| | | | Parts by weight | 0.15 | 0.15 | 0.15 | 0.15 | 0.15 | 0.15 |
| | | Diene-based monomer | Time point | 70 | 70 | 70 | 70 | 70 | 70 |
| | | | Parts by weight | 15 | 15 | 15 | 15 | 15 | 15 |
| | | Initiator | Time point | 75 | 75 | 75 | 75 | 75 | 75 |
| | | | Parts by weight | 0.07 | 0.07 | 0.07 | 0.07 | 0.07 | 0.07 |
| | | Emulsifier | Time point | 75 | 75 | 75 | 75 | 75 | 75 |
| | | | Parts by weight | 0.37 | 0.37 | 0.37 | 0.37 | 0.37 | 0.37 |
| | Third addition | Initiator | Time point | 85 | 85 | 85 | 85 | 85 | 85 |
| | | | Parts by weight | 0.05 | 0.05 | 0.05 | 0.05 | 0.05 | 0.05 |
| | | Emulsifier | Time point | 85 | 85 | 85 | 85 | 85 | 85 |
| | | | Parts by weight | 0.15 | 0.15 | 0.15 | 0.15 | 0.15 | 0.15 |

TABLE 2-continued

| | | Example | | | | | |
|---|---|---|---|---|---|---|---|
| Classification | | 1 | 2 | 3 | 4 | 5 | 6 |
| Diene-based rubber polymer | Average particle diameter (nm) | 308.1 | 302.3 | 302.3 | 305.2 | 305.2 | 310.1 |
| | Particle diameter distribution (%) 30 ≤ Particle diameter (nm) < 100 | 3 | 3 | 3 | 4 | 4 | 3 |
| | 100 ≤ Particle diameter (nm) < 350 | 80 | 83 | 83 | 82 | 82 | 81 |
| | 350 ≤ Particle diameter (nm) ≤ 550 | 17 | 14 | 14 | 14 | 14 | 16 |
| | Coagulum content (wt %) | 0.09 | 0.12 | 0.12 | 0.03 | 0.03 | 0.1 |
| | Gel content (%) | 70.3 | 73.3 | 73.3 | 75.8 | 75.8 | 76.5 |
| Graft polymer | Graft polymer latex (parts by weight) | 45 | 45 | 45 | 45 | 45 | 45 |
| | Coagulant (parts by weight) Magnesium sulfate | 2 | 2 | — | 2 | — | 2 |
| | Sulfuric acid | — | — | 2 | — | 2 | — |
| Thermoplastic resin composition | Flow index (10 g/min) | 25.9 | 26.0 | 28.5 | 26.2 | 28.7 | 26.0 |
| | Impact strength (kgf · cm/cm) | 23.1 | 22.8 | 21.4 | 25.2 | 22.5 | 24.9 |
| | Tensile strength (kgf/cm²) | 490 | 492 | 471 | 485 | 472 | 488 |
| | Surface gloss 20° | 82.1 | 82.7 | 70.1 | 85.5 | 76.7 | 83.1 |
| | 45° | 97.2 | 97.1 | 93.2 | 99.1 | 95.3 | 97.8 |

TABLE 3

| | | | | Comparative Example | | | Example | | Comparative Example |
|---|---|---|---|---|---|---|---|---|---|
| Classification | | | | 5 | 6 | 7 | 7 | 8 | 8 |
| Preparation of diene-based rubber polymer [Polymerization conversion rate (%)] | First addition | Molecular-weight regulator | Time point | 0 | 0 | 0 | 0 | 0 | 0 |
| | | | Parts by weight | 0.3 | 0.3 | 0.3 | 0.3 | 0.3 | 0.3 |
| | | Diene-based monomer | Time point | 0 | 0 | 0 | 0 | 0 | 0 |
| | | | Parts by weight | 85 | 100 | 85 | 85 | 85 | 85 |
| | | Initiator | Time point | 0 | 0 | 0 | 0 | 0 | 0 |
| | | | Parts by weight | 0.3 | 0.3 | 0.3 | 0.3 | 0.3 | 0.3 |
| | | Emulsifier | Time point | 0 | 0 | 0 | 0 | 0 | 0 |
| | | | Parts by weight | 1.5 | 1.5 | 1.5 | 1.5 | 1.5 | 1.5 |
| | Second addition | Molecular-weight regulator | Time point | 75 | 55 | 55 | 55 | 55 | 55 |
| | | | Parts by weight | 0.15 | 0.15 | 0.15 | 0.15 | 0.15 | 0.15 |
| | | Diene-based monomer | Time point | 70 | — | 60 | 65 | 75 | 80 |
| | | | Parts by weight | 15 | — | 15 | 15 | 15 | 15 |
| | | Initiator | Time point | 75 | 75 | 75 | 75 | 75 | 75 |
| | | | Parts by weight | 0.07 | 0.07 | 0.07 | 0.07 | 0.07 | 0.07 |
| | | Emulsifier | Time point | 75 | 75 | 75 | 75 | 75 | 75 |
| | | | Parts by weight | 0.37 | 0.37 | 0.37 | 0.37 | 0.37 | 0.37 |
| | Third addition | Initiator | Time point | 85 | 85 | 85 | 85 | 85 | 85 |
| | | | Parts by weight | 0.05 | 0.05 | 0.05 | 0.05 | 0.05 | 0.05 |
| | | Emulsifier | Time point | 85 | 85 | 85 | 85 | 85 | 85 |
| | | | Parts by weight | 0.15 | 0.15 | 0.15 | 0.15 | 0.15 | 0.15 |
| Diene-based rubber polymer | Average particle diameter (nm) | | | 303.3 | 298.2 | 299.5 | 306.3 | 305.2 | 298.4 |
| | Particle diameter distribution (%) | 30 ≤ Particle diameter (nm) < 100 | | 4 | 1 | 1 | 4 | 5 | 9 |
| | | 100 ≤ Particle diameter (nm) < 350 | | 83 | 85 | 84 | 83 | 80 | 83 |
| | | 350 ≤ Particle diameter (nm) ≤ 550 | | 13 | 14 | 15 | 13 | 15 | 8 |
| | Coagulum content (wt %) | | | 0.15 | 0.24 | 0.19 | 0.12 | 0.1 | 0.17 |
| | Gel content (%) | | | 88.2 | 84.2 | 81.5 | 73.1 | 72.9 | 76.5 |
| Graft polymer | Graft polymer latex (parts by weight) | | | 45 | 45 | 45 | 45 | 45 | 45 |
| | Coagulant (parts by weight) | Magnesium sulfate | | 2 | 2 | 2 | 2 | 2 | 2 |
| | | Sulfuric acid | | — | — | — | — | — | — |
| Thermoplastic resin composition | Flow index (10 g/min) | | | 27.0 | 26.8 | 26.7 | 26.5 | 26.3 | 26.9 |
| | Impact strength (kgf · cm/cm) | | | 20.7 | 21.8 | 22.5 | 23.6 | 23.7 | 19.5 |
| | Tensile strength (kgf/cm²) | | | 500 | 491 | 481 | 487 | 488 | 507 |
| | Surface gloss | 20° | | 82.5 | 76.2 | 77.7 | 83.0 | 82.7 | 82.5 |
| | | 45° | | 95.4 | 91.5 | 91.9 | 97.1 | 96.5 | 96.5 |

TABLE 4

| | | | | Comparative Example | | Example | | Comparative Example |
|---|---|---|---|---|---|---|---|---|
| Classification | | | | 9 | 10 | 9 | 10 | 11 |
| Preparation of diene-based rubber polymer [Polymerization conversion rate (%)] | First addition | Molecular-weight regulator | Time point | 0 | 0 | 0 | 0 | 0 |
| | | | Parts by weight | 0.3 | 0.3 | 0.3 | 0.3 | 0.3 |
| | | Diene-based monomer | Time point | 0 | 0 | 0 | 0 | 0 |
| | | | Parts by weight | 85 | 85 | 85 | 85 | 85 |
| | | Initiator | Time point | 0 | 0 | 0 | 0 | 0 |
| | | | Parts by weight | 0.3 | 0.3 | 0.3 | 0.3 | 0.3 |
| | | Emulsifier | Time point | 0 | 0 | 0 | 0 | 0 |
| | | | Parts by weight | 1.5 | 1.5 | 1.5 | 1.5 | 1.5 |
| | Second addition | Molecular-weight regulator | Time point | 55 | 55 | 55 | 55 | 55 |
| | | | Parts by weight | 0.15 | 0.15 | 0.15 | 0.15 | 0.15 |
| | | Diene-based monomer | Time point | 70 | 70 | 70 | 70 | 70 |
| | | | Parts by weight | 15 | 15 | 15 | 15 | 15 |
| | | Initiator | Time point | — | 65 | 70 | 80 | 83 |
| | | | Parts by weight | — | 0.07 | 0.07 | 0.07 | 0.07 |
| | | Emulsifier | Time point | 75 | 65 | 70 | 80 | 83 |
| | | | Parts by weight | 0.37 | 0.37 | 0.37 | 0.37 | 0.37 |
| | Third addition | Initiator | Time point | 85 | 85 | 85 | 85 | 85 |
| | | | Parts by weight | 0.05 | 0.05 | 0.05 | 0.05 | 0.05 |
| | | Emulsifier | Time point | 85 | 85 | 85 | 85 | 85 |
| | | | Parts by weight | 0.15 | 0.15 | 0.15 | 0.15 | 0.15 |
| Diene-based rubber polymer | Average particle diameter (nm) | | | 292.5 | 303.3 | 304.5 | 309.2 | 289.3 |
| | Particle diameter distribution (%) | $30 \leq$ Particle diameter (nm) $< 100$ | | 7 | 1 | 3 | 4 | 9 |
| | | $100 \leq$ Particle diameter (nm) $< 350$ | | 80 | 86 | 83 | 83 | 86 |
| | | $350 \leq$ Particle diameter (nm) $\leq 550$ | | 13 | 13 | 14 | 13 | 5 |
| | Coagulum content (wt %) | | | 0.25 | 0.21 | 0.08 | 0.11 | 0.18 |
| | Gel content (%) | | | 79.5 | 75.7 | 72.5 | 73.5 | 74.5 |
| Graft polymer | Graft polymer latex (parts by weight) | | | 45 | 45 | 45 | 45 | 45 |
| | Coagulant (parts by weight) | Magnesium sulfate | | 2 | 2 | 2 | 2 | 2 |
| | | Sulfuric acid | | — | — | — | — | — |
| Thermoplastic resin composition | Flow index (10 g/min) | | | 26.4 | 26.0 | 26.1 | 26.7 | 26.1 |
| | Impact strength (kgf·cm/cm) | | | 20.0 | 22.8 | 22.9 | 23.5 | 19.4 |
| | Tensile strength (kgf/cm$^2$) | | | 497 | 486 | 491 | 487 | 501 |
| | Surface gloss | 20° | | 80.5 | 77.2 | 83.2 | 83.2 | 82.8 |
| | | 45° | | 95.2 | 91.5 | 97.4 | 97.0 | 96.9 |

TABLE 5

| | | | | Comparative Example | | Example | Comparative Example |
|---|---|---|---|---|---|---|---|
| Classification | | | | 12 | 13 | 11 | 14 |
| Preparation of diene-based rubber polymer [Polymerization conversion rate (%)] | First addition | Molecular-weight regulator | Time point | 0 | 0 | 0 | 0 |
| | | | Parts by weight | 0.3 | 0.3 | 0.3 | 0.3 |
| | | Diene-based monomer | Time point | 0 | 0 | 0 | 0 |
| | | | Parts by weight | 85 | 85 | 85 | 85 |
| | | Initiator | Time point | 0 | 0 | 0 | 0 |
| | | | Parts by weight | 0.3 | 0.3 | 0.3 | 0.3 |
| | | Emulsifier | Time point | 0 | 0 | 0 | 0 |
| | | | Parts by weight | 1.5 | 1.5 | 1.5 | 1.5 |
| | Second addition | Molecular-weight regulator | Time point | 55 | 55 | 55 | 55 |
| | | | Parts by weight | 0.15 | 0.15 | 0.15 | 0.15 |
| | | Diene-based monomer | Time point | 70 | 70 | 70 | 70 |
| | | | Parts by weight | 15 | 15 | 15 | 15 |
| | | Initiator | Time point | 75 | 75 | 75 | 75 |
| | | | Parts by weight | 0.07 | 0.07 | 0.07 | 0.07 |
| | | Emulsifier | Time point | 75 | 75 | 75 | 75 |
| | | | Parts by weight | 0.37 | 0.37 | 0.07 | 0.07 |
| | Third addition | Initiator | Time point | — | 83 | 90 | 93 |
| | | | Parts by weight | — | 0.05 | 0.05 | 0.05 |
| | | Emulsifier | Time point | 85 | 83 | 90 | 93 |
| | | | Parts by weight | 0.15 | 0.15 | 0.15 | 0.15 |

TABLE 5-continued

|  | Classification |  | Comparative Example 12 | 13 | Example 11 | Comparative Example 14 |
|---|---|---|---|---|---|---|
| Diene-based rubber polymer | Average particle diameter (nm) |  | 305.2 | 285.2 | 308.1 | 305.5 |
|  | Particle diameter distribution (%) | 30 ≤ Particle diameter (nm) < 100 | 0 | 12 | 3 | 0 |
|  |  | 100 < Particle diameter (nm) < 350 | 82 | 86 | 76 | 86 |
|  |  | 350 ≤ Particle diameter (nm) ≤ 550 | 18 | 2 | 21 | 14 |
|  | Coagulum content (wt %) |  | 0.15 | 0.27 | 0.09 | 0.31 |
|  | Gel content (%) |  | 73.5 | 81.2 | 72.9 | 76.5 |
| Graft polymer | Graft polymer latex (parts by weight) |  | 45 | 45 | 45 | 45 |
|  | Coagulant (parts by weight) | Magnesium sulfate | — | 2 | 2 | 2 |
|  |  | Sulfuric acid | 2 | — | — | — |
| Thermoplastic resin composition | Flow index (10 g/min) |  | 26.5 | 27.1 | 26.2 | 26.8 |
|  | Impact strength (kgf · cm/cm) |  | 22.5 | 18.5 | 22.8 | 21.9 |
|  | Tensile strength (kgf/cm$^2$) |  | 482 | 516 | 492 | 490 |
|  | Surface gloss | 20° | 73.1 | 82.1 | 82.5 | 74.2 |
|  |  | 45° | 88.5 | 96.9 | 97.3 | 89.5 |

Referring to Tables, it can be seen that in the case of Examples 1, 2, 4, and 6 to 11 in which magnesium sulfate was used as a coagulant, since the thermoplastic resin compositions had an impact strength of 22.8 kgf·cm/cm or more and a tensile strength of 485 kgf/cm$^2$ or more, mechanical properties were excellent. In addition, since surface gloss was 82.1 or more when measured at 20° and 96.5 or more when measured at 45°, it can be seen that surface gloss was also excellent. In addition, when Example 2 was compared with Example 3 and Example 4 was compared with Example 5, it can be seen that when magnesium sulfate was used as a coagulant, better impact strength and better surface gloss were exhibited than when sulfuric acid was used as a coagulant.

Meanwhile, it can be seen that in the case of Comparative Examples 1 and 2 in which a molecular-weight regulator was not added a second time and an initiator and an emulsifier were not added a third time, since the gel content of a diene-based rubber polymer was higher than in the case of Examples in which the same coagulant was used, the impact strength of a thermoplastic resin composition was lowered. In addition, it can be seen that in the case of Comparative Examples 1 and 2, since a diene-based rubber polymer having a particle diameter of 30 to 100 nm was not produced, the surface gloss of a thermoplastic resin composition was lowered as compared to the case of Examples in which the same coagulant was used.

In addition, it can be seen that in the case of Comparative Example 3 in which a molecular-weight regulator was not added a second time, since more coagulum (0.32 wt %) was produced in a diene-based rubber polymer than in the case of Example 2 having the same particle diameter distribution, latex stability was lowered, and since polymerization loss was large, preparing efficiency was lowered. In addition, it can be seen that in the case of Comparative Example 3, since the gel content of a diene-based rubber polymer was 90% or more, the impact strength of a thermoplastic resin composition was lowered as compared to the case of Examples.

In addition, it can be seen that in the case of Comparative Example 4 in which a molecular-weight regulator was added a second time when a polymerization conversion rate of 45% was reached, since the gel content of a diene-based rubber polymer was excessively low as compared to the case of Examples 1, 2, 4, and 6, the impact strength of a thermoplastic resin composition was lowered. It can be seen that in the case of Comparative Example 5 in which a molecular-weight regulator was added a second time when a polymerization conversion rate of 75% was reached, since the gel content of a diene-based rubber polymer was excessively high as compared to the case of Examples 1, 2, 4, and 6, the impact strength of a thermoplastic resin composition was lowered.

In addition, it can be seen that in the case of Comparative Example 6 in which a diene-based monomer was not added a second time, Comparative Example 7 in which a diene-based monomer was added a second time when a polymerization conversion rate of 60% was reached, and Comparative Example 8 in which a diene-based monomer was added a second time when a polymerization conversion rate of 80% was reached, impact strength and surface gloss were lowered as compared to the case of Examples 1, 7, and 8 in which a diene-based monomer was added a second time when a polymerization conversion rate of 65 to 75% was reached.

In addition, it can be seen that in the case of Comparative Example 9 in which an initiator was not added a second time, Comparative Example 10 in which an initiator and an emulsifier were added a second time when a polymerization conversion rate of 65% was reached, and Comparative Example 11 in which an initiator and an emulsifier were added a second time when a polymerization conversion rate of 83% was reached, an excessive amount of coagulum was produced in a diene-based rubber polymer and the impact strength and surface gloss of a thermoplastic resin composition were lowered as compared to the case of Examples 1, 9, and 10 in which an initiator and an emulsifier were added a second time when a polymerization conversion rate of 70 to 80% was reached.

In addition, it can be seen that in the case of Comparative Example 12 in which an initiator was not added a third time, since a small amount of diene-based rubber polymer having a particle diameter of 30 nm or more and less than 100 nm was produced, surface gloss was lowered as compared to the case of Examples 1 and 11 in which an initiator and an emulsifier were added a third time when a polymerization conversion rate of 85 to 90% was reached.

It can be seen that in the case of Comparative Example 13 in which an initiator and an emulsifier were added a third time when a polymerization conversion rate of 83% was reached, since a small amount of diene-based rubber polymer having a particle diameter of 350 nm or more and less than 500 nm was produced, impact strength was lowered as compared to the case of Examples 1 and 11 in which an initiator and an emulsifier were added a third time when a polymerization conversion rate of 85 to 90% was reached.

It can be seen that in the case of Comparative Example 14 in which an initiator and an emulsifier were added a third time when a polymerization conversion rate of 93% was reached, since a diene-based rubber polymer having a particle size of 30 nm or more and less than 100 nm was not produced, surface gloss was lowered as compared to the case of Examples 1 and 11 in which an initiator and an emulsifier were added a third time when a polymerization conversion rate of 85 to 90% was reached. In addition, it can be seen that in the case of Comparative Example 14, impact strength was also lowered as compared to the case of Examples 1 and 11.

The invention claimed is:

1. A method of preparing a diene-based rubber polymer, comprising:
    adding each of a diene-based monomer, a molecular-weight regulator, an initiator, and an emulsifier to a reactor a first time and carrying out polymerization;
    adding a molecular-weight regulator to the reactor a second time when a polymerization conversion rate of 48 to 72% is reached and carrying out polymerization;
    adding a diene-based monomer to the reactor a second time when a polymerization conversion rate of 63 to 77% is reached and carrying out polymerization;
    adding each of an initiator and an emulsifier to the reactor a second time when a polymerization conversion rate of 68 to 81% is reached and carrying out polymerization; and
    adding each of an initiator and an emulsifier to the reactor a third time when a polymerization conversion rate of 85 to 91% was reached and carrying out polymerization.

2. The method of claim 1, wherein the molecular-weight regulator is added to the reactor the second time when a polymerization conversion rate of 50 to 70% is reached, and polymerization is performed.

3. The method of claim 1, wherein the diene-based monomer is added to the reactor the second time when a polymerization conversion rate of 65 to 75% is reached, and polymerization is performed.

4. The method of claim 1, wherein each of the initiator and the emulsifier is added to the reactor the second time when a polymerization conversion rate of 70 to 80% is reached, and polymerization is performed.

5. The method of claim 1, wherein each of the initiator and the emulsifier is added to the reactor the third time when a polymerization conversion rate of 85 to 90% is reached, and polymerization is performed.

6. The method of claim 1, wherein a weight ratio of the diene-based monomer added the first time and the diene-based monomer added the second time is in a range of 70:30 to 90:10.

7. The method of claim 1, wherein a weight ratio of the molecular-weight regulator added the first time and the molecular-weight regulator added the second time is in a range of 60:40 to 75:25.

8. The method of claim 1, wherein, based on a total weight of the initiator added the first time, second time, and third time:
    a weight of the initiator added the first time is in a range of 60 to 80%;
    a weight of the initiator added the second time is in a range of 7 to 25%; and
    a weight of the initiator added the third time is in a range of 5 to 20%.

9. The method of claim 1, wherein, based on a total weight of the emulsifier added the first time, second time, and third time:
    a weight of the emulsifier added the first time is in a range of 65 to 85%;
    a weight of the emulsifier added the second time is in a range of 10 to 30%; and
    a weight of the emulsifier added the third time is in a range of 3 to 15%.

10. A method of preparing a graft polymer, comprising:
    preparing a diene-based rubber polymer by the method of claim 1; and
    graft-polymerizing an aromatic vinyl-based monomer and a vinyl cyanide-based monomer to the diene-based rubber polymer and thus preparing a graft polymer.

* * * * *